United States Patent

[11] 3,545,359

| [72] | Inventors | Paul Fahlenberg<br>Baierbrunn(near Munich);<br>Wilhelm Pross, Munich; Heinrich<br>Wildfeuer, Munich-Aubing, Germany |
|---|---|---|
| [21] | Appl. No. | 726,695 |
| [22] | Filed | May 6, 1968 |
| [45] | Patented | Dec. 8, 1970 |
| [73] | Assignee | Compur-Werk Gesellschaft mit<br>beschrankter Haftung & Co.<br>Munich, Germany<br>a German firm |
| [32] | Priority | May 8, 1967 |
| [33] | | Germany |
| [31] | | No. C42258 |

[54] PHOTOGRAPHIC SHUTTER
3 Claims, 3 Drawing Figs.

[52] U.S. Cl......................................................... 95/53;
95/63; 317/148.5
[51] Int. Cl....................................................... G03b 9/00

[50] Field of Search.......................................... 95/53(elec),
63, 10(C), (Inquired)

[56] References Cited
UNITED STATES PATENTS

| 3,104,323 | 9/1963 | Over et al. ..................... | 250/214 |
| 3,194,977 | 7/1965 | Anzalone et al. ............. | 307/88.5 |
| 3,231,787 | 1/1966 | Knudson ....................... | 317/148.5 |
| 3,295,424 | 1/1967 | Biber............................ | 95/10 |

*Primary Examiner*—John M. Horan
*Assistant Examiner*—Richard L. Moses
*Attorneys*—Charles Shepard and Stonebraker & Shepard ABSTRACT: A photographic shutter is arranged to have the exposure time controlled by an electronic circuit including a plurality of transistors. To avoid timing errors which might otherwise be caused by changes in the characteristics of the transistors as a result of changes in temperature, the circuit is so arranged that the temperature gradient of one transistor is compensated by the temperature gradient of another transistor.

3,545,359

PHOTOGRAPHIC SHUTTER

CROSS REFERENCE TO RELATED APPLICATION

The physical structure of the shutter (as distinguished from the electronic circuitry) may be substantially identical with that disclosed in connection with FIG. 1 of the drawings of U.S. Pat. No. 3,376,801, granted Apr. 9, 1968 on the application of Paul Fahlenberg, one of the joint applicants of the present application. FIG. 1 of the drawings of the present application is substantially a duplicate of FIG. 1 of the drawings of said patent, even using the same reference numerals, and in the present application the description of the physical structure is considerably abbreviated, on the assumption that the reader is already familiar with said U.S. Pat. No. 3,376,801, or can derive any desired additional information regarding such physical structure by studying said patent. The electronic circuitry of the present application is, however, different from and an improvement upon the electronic circuitry disclosed in said patent.

BACKGROUND OF THE INVENTION

For best results, a modern photographic shutter should be able to control accurately the exposure time or duration, so that when the shutter mechanism is set for taking an exposure of a particular duration (usually referred to as the shutter speed) the actual duration of the exposure will be the intended duration. In recent years there has been a tendency to use electronic circuits to control the shutter speed, these circuits usually employing one or more transistors. One difficulty which has been encountered is that a transistor has a temperature gradient; that is, the operation of the transistor varies with changes in temperature. This has caused some irregularity in the duration of the photographic exposure, particularly in hand cameras for use out of doors, where considerable variation in temperature may be encountered.

In the present invention, this is overcome by designing the electronic circuitry so that the temperature gradient of one transistor is compensated by the temperature gradient of another transistor in the electronic circuit. Thus a high degree of overall stability or constancy is achieved, and the actual shutter speed is substantially constant over a wide range of temperatures.

Accordingly, it is an object of the invention to provide a generally improved and more satisfactory photographic shutter.

Another object is the provision of a shutter so designed that unwanted variations in shutter speed, due to variations in temperature, are eliminated or greatly reduced.

Still another object is the provision of a shutter in which variations due to temperature changes are reduced by employing an electronic circuit of relatively simple and economical design, in which the temperature gradient of one transistor is compensated or counterbalanced by the temperature gradient of another transistor.

A further object is the provision of an electronic circuit arrangement suitable for controlling the duration of exposure of a photographic shutter in general, and which, although here disclosed in connection with an objective shutter, is useful also in connection with shutters of other types, such as focal plane shutters.

BRIEF DESCRIPTION OF THE DRAWINGS

In the accompanying drawings, which are incorporated herein by reference and constitute a material part of the disclosure, and which illustrate an exemplary embodiment of the invention.

DESCRIPTION OF THE PREFERRED EMBODIMENT

Figure 1:
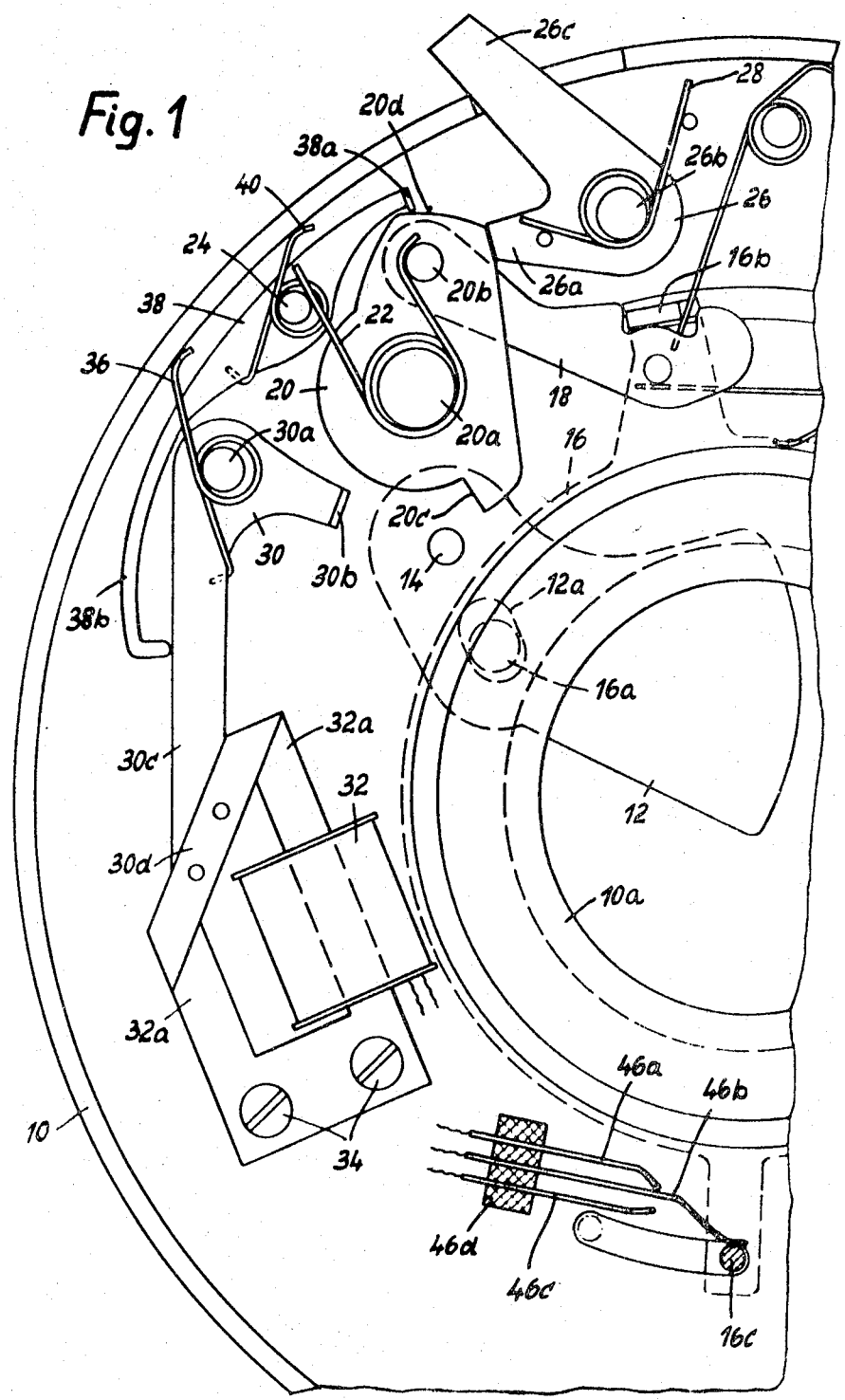
FIG. 1 is a fragmentary front view of the structural or mechanical parts of a photographic shutter in accordance with a preferred embodiment of the present invention, with the front cover removed in order to show the interior parts, and with other parts omitted.

As already indicated, the mechanical part of the shutter construction, as shown in FIG. 1 of the present drawings, may be identical with the mechanical parts shown in FIG. 1 of said U.S. Pat. No. 3,376,801, to which reference is made for a more complete description. The housing or casing 10 is of the familiar annular form, and has a lens tube 10a encircling the optical axis and defining the exposure aperture. There are shutter blades 12 of any desired number, usually about five, only one of which is here shown. Each blade is pivoted in the housing at 14, and has a control slot 12a in which is engaged a pin 16a of a conventional blade ring 16, rotatable about the lens tube 10a. When the blade ring is turned to its counterclockwise limit position, shown in FIG. 1, the blades are closed; when it turns clockwise from this position, the blades are opened so that light may pass through the exposure aperture.

A radial arm on the blade ring carries a lug 16b engaged by a light spring tending to turn the blade ring counterclockwise. The lug 16b is also engaged in a notch near one end of an operating link 18, the other end of which is pivoted at 20b to main operating member or "master member" 20 which is fixed to a shaft 20a which extends out through the back wall of the shutter housing to a convenient position where it may be operated by conventional mechanism to turn the shaft and the master member to cock or tension the shutter ready for the next exposure. This is usually done, in conventional known manner, in synchronism with the winding of the film.

The master spring 22 has one end engaged with the master member and the other end engaged with a fixed pin 24 in the shutter housing, and tends to turn the master member clockwise. When the master member is tensioned or cocked by moving it counterclockwise against the force of the spring 22, it may be held in the tensioned position by the latch or trip 26 pivoted in the housing at 26b, having one arm 26a for holding the master member and another arm 26c which extends out through a slot in the housing to an accessible external position where it may be moved manually to release or trip the shutter to make an exposure. In a manner well understood in the art, clockwise movement of the master member from the initial tensioned position will push the link 18 so that the link pushes the lug 16b on the blade ring 16 to open the shutter blades during the first part of the running down movement of the master member. Then during the latter part of the running down movement, the master member will pull leftwardly on the link 18, pulling the blade ring 16 back in a counterclockwise direction to close the blades. The duration of the exposure can be controlled by blocking the running down movement of the master member at an intermediate position in which the shutter blades are open. The time interval during which this running down movement is blocked is controlled by the electronic circuitry. A spring 28 tends to hold the trip member 26 in latching position.

Another latching member 30, preferably of insulating material, is pivotally mounted at 30a, and has one arm 30b which, in one position of the lever 30, lies in the path of travel of an abutment shoulder 20c on the master member 20. Another arm 30c of the lever 30 carries a metallic armature 30d cooperating with a generally U-shaped core 32a of an electromagnet, the coil 32 of which is connected in the electronic circuitry which will be described in more detail below. The electromagnet core 32 is fastened in the shutter housing by means of screws 34, with interposition of suitable insulating material. Preferably the screwed connection is adjustable so that the required position of the magnetic core in relation to the armature can be readily set during assembly of the shutter parts, and thereafter can be held secure.

A spring 36 biases the latching lever 30 in a clockwise direction. A double-armed setting lever 38 is pivotally mounted on the pin 24 and biased in a clockwise direction by a spring 40. One arm 38a cooperates with a control cam portion 20d on the master member, while the other arm 38b of the lever 38 bears against the latching lever 30 and urges the lever 30 in a counterclockwise direction contrary to the force of the spring 36, thus urging the armature 30d against the magnetic core 32a. The arm 38b is inherently resilient, so that during the tensioning procedure, any over travel caused by the cam formation 20d may be absorbed by the inherent resilience of the arm 38b.

As shown near the bottom of FIG. 1, the shutter also contains a changeover switch having three resilient metal contact members or arms 46a, 46b, and 46c, mounted on an insulating block 46d. The inherent resilience of these arms normally tends to keep the arm 46b in contact with the arm 46c and out of contact with the arm 46a. However, an insulating pin 16c on an arm on the blade ring 16 displaces the arm 46b to hold it out of contact with the arm 46c and in contact with the arm 46a, when the blade ring is in the position shown in FIG. 1, with the shutter blades closed. When the blade ring moves clockwise to open the blades, the pin 16c moves to a position where the springiness of the arm 46b will cause it to move out of contact with the member 46a and into contact with the member 46c.

Figure 2:
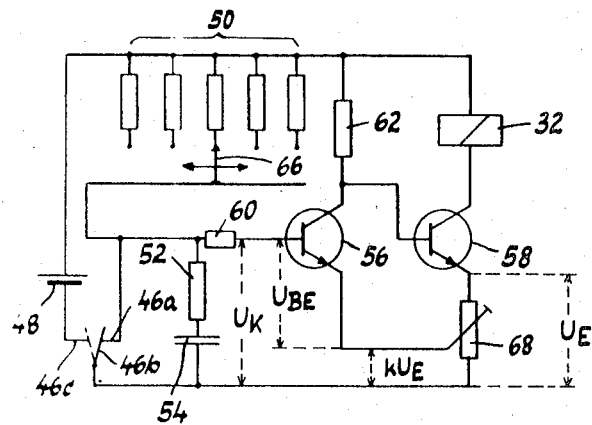
FIG. 2 is a wiring diagram illustrating the electronic circuitry according to one embodiment of the present invention.

The electronic circuitry, according to the first form of the invention, is indicated in FIG. 2. It includes a battery 48, and a resistance-capacitance portion or RC portion, and works on the principle that during the running down motion of the master member, the latching lever 30 will hold the master member in an intermediate position, with the shutter blades open, so long as current is flowing through the winding 32 of the electromagnet, thereby keeping the armature 30d against the magnetic core 32a of the electromagnet. When current ceases to flow through the winding 32, so that the armature 30d is no longer attracted, the spring 36 can swing the arm 30 to a position where it no longer obstructs the running down movement of the master member 20, which can then continue its movement and close the shutter blades. Thus a change in the length of time that current flows through the winding 32, will change the length of time that the shutter blades are held in open position by the latching lever 30, and this will change the shutter speed or duration of exposure.

The RC portion of the circuit can be set to a selected value, in order to vary the shutter speed as desired. A series of resistance members of different values are collectively indicated at 50, and any selected one of these may be made effective in the circuit by an adjustable slider 66 to make contact with the selected resistance. The slider 66 is manually adjustable if manual adjustment of the shutter speed is desired. If automatic adjustment is desired, a photo resistance may be employed, either in place of the separate manually adjustable resistances, or in conjunction with them, so that the slider 66 may be set to make contact with the photoresistance when automatic exposure control is wanted, or with any selected one of the other resistance members, when manual control is wanted.

When the switch 46b is in the position making contact with member 46c, the battery 48 will charge the time-determining capacitor or condenser 54, through the limit resistance 52 and through the selected one of the resistances collectively shown at 50, depending upon the setting of the slider 66.

Other parts of the electronic circuit include transistors 56 and 58, a protective resistance 60, a collector resistance 62, and the previously mentioned winding 32 of the electromagnet. There is also a setting potentiometer 68 for adjusting the control period in the regulating arrangement. The various elements are connected to each other by conductors plainly shown in FIG. 2 and readily understandable by those skilled in the art, so that the connections need not be further described.

In this embodiment of the circuitry, as illustrated in FIG. 2, the shutter operates as follows: it will be assumed that the parts are in the positions illustrated in FIGS. 1 and 2, with the mechanical parts of the shutter cocked or tensioned, and the battery disconnected from the regulating arrangement; that is, with the switch member 46b out of contact with the contact member 46c and in contact with the member 46a. In this position of the parts, no current is flowing through the magnetic winding 32, so that the armature 30d is not attracted to the electromagnet. However, the armature is held tight against the core 32a of the electromagnet by the resilient arm 38b.

If the trigger or trip 26 is now operated to start the exposure cycle, the master member 20 is released and starts to run down in a clockwise direction, pushing the link 18 to turn the blade ring 16 clockwise to open the shutter blades 12. Right at the beginning of this running down motion, the pin 16c of the blade ring operates on the switch so that the contact between 46b and 46a is broken, and contact is made between 46b and 46c, thus connecting the battery 48 electrically to the regulating arrangement. The emitter conductor of the two transistors 56 and 58 is thus connected to the battery 48, and the short circuit of the time-determining capacitor 54 is eliminated. Since the base of the transistor 56 is at a voltage below its emitter potential determined by the transistor 58, this transistor 56 performs a complete blocking function at the moment of switch-on, so that the base of the transistor 58 is coupled to the battery 48 through the resistance 62. The collector current which consequently flows through the transistor 58 energizes the winding 32 of the holding magnet 32a, so that the armature 30d is gripped by the full holding force of the magnet, after a very short lapse of time. The control cam formation 20d on the master member 20 has meanwhile held the lever 38 to prevent the armature 30d from being moved away from the magnet 32a by the action of the spring 36, during the short lapse of time which precedes the energization of the magnet winding 32. As the master member 20 runs down, the abutment portion 20c will strike the portion 30b of the lever 30, which will stop the further running down movement of the master member in a position in which the blades 12 are fully open. By the time this happens, current is already flowing through the electromagnet winding 32, thus keeping the blocking or latching lever 30 in the latching position, notwithstanding the fact that meanwhile the cam portion 20d of the master member has moved beyond the end 38a of the lever 38 so that the lever 38 is released and the latching lever 30 is free to move to its unlatching position as soon as current ceases to flow through the electromagnet winding 32.

When the switch member 46b is moved over from 46a to 46c (at the very beginning of the running down movement, as above described) a charging current begins to flow through the resistance 50 into the capacitor 54, and this flow continues until the base of the transistor 56 exceeds its emitter voltage. At this moment the transistor 56 begins to conduct, and there is a slight voltage drop at the resistance 62. The conductivity of the transistor 58 consequently falls a small amount, in consequence of which there is also a voltage drop at the potentiometer 68, because the charging current in the input transistor 56 is less by the amplification factor of the two transistors and consequently has no effect on the potentiometer 68. Thus the emitter voltage of the transistor 56 is reduced, and the voltage difference between the base and the emitter of this transistor 56 increases, especially as the voltage at the capacitor 54 further increases in the meantime. The now augmented current flow in the transistor 56 become effective, in the manner described above again through the feed back, so that the current in the transistor 56 rises and falls equally abruptly in the transistor 58. The transistor 56 thus becomes conductive while the transistor 58 is blocked.

As soon as the current flow through the transistor 58 ceases, it also ceases in the winding 32, and consequently the holding magnet 32a becomes deenergized. The spring 36 can now move the latching lever 30 in a clockwise direction, thereby moving the arm 30b out of latching engagement with the abutment nose 20c of the master member 20. The master member may now resume its running down movement in a clockwise direction until it reaches its rest position as determined by a conventional abutment (not shown), and this further movement of the master member moves the blade ring 16 back from the blade open position to the blade closed position, thus terminating the exposure after an interval determined by the value of the resistance 50. When the blade ring 16 moves back into its rest position at the termination of the exposure (which position of the blade ring is identical with its position in the tensioned or cocked position of the shutter, and is shown in FIG. 1) the pin 16c on the blade ring again moves the switch member 46b out of contact with the switch member 46c and into contact with the switch member 46a, as a consequence of which the current flow to the emitter conductor of the two transistors 56 and 58 is interrupted, and a discharge of the capacitor 54 through the resistance 52 is brought about.

This electronic circuit arrangement, including the battery 48, may all be installed within the annular shutter housing 10, if desired, or may be placed in a separate housing or container plugged in or otherwise suitably connected to the shutter housing. It is also pointed out that the slider 66 for selecting any particular one of the resistances 50, may be and preferably is operatively connected to a rotatable adjusting ring or other movable adjusting member at the front of the shutter housing, moving in relation to a fixed scale of shutter speeds or exposure durations.

The following explanation is given in connection with the problem of temperature compensation in the electronic arrangement which has been described and illustrated.

The sweep voltage $U_k$ of the trigger circuit illustrated in FIG. 2 is composed of the base-emitter voltage $U_{BE}$ of the input transistor 56, and a part of the voltage which is taken from the emitter resistance of the output transistor 58. This part will be referred to as $KU_E$. K is a number between 0 and 1 which represents the ratio voltage divider, while $U_E$ is the emitter voltage at the transistor 58. $U_E$ is obtained, in the rest condition of the trigger, by multiplying the collector current of the transistor 58 by the value of the emitter resistance 68 of the transistor 58. This figure indicates a voltage, part of which, together with the base-emitter voltage of the transistor 56, determines the sweep voltage $U_k$ of the circuit. The temperature gradient of the trigger circuit will then become "zero" ($U_k$=constant) in accordance with the known equation, when $U_{BE}$ shows the reverse gradient to $KU_E$.

This derives from the fact that the base-emitter voltage of the transistor 56 is dependent upon temperature and falls with the temperature, about 0.003 per degree centigrade, while the emitter current of the transistor 58 increases with the same change in temperature. It is therefore evident, that for the purpose of mutually balancing out two temperature gradients a suitable dimensioning of the reaction or feedback factor K is necessary. This dimensioning is achieved by selection and/or coordination of the values of the circuitry elements, mainly transistors 56, 58 and capacitor 54, so that the temperature gradient of the complete circuit is compensated in a range from −40° to +60° centigrade, that is to say, so that the complete circuit is indifferent to temperature changes within this range.

A further disadvantage of the previously known trigger circuits is their dependence on the operating voltage, particularly the potential difference at the battery. According to another feature of the present invention, which will now be described in connection with FIG. 3, a decisive improvement is achieved by using a voltage regulator to stabilize the battery voltage. This voltage regulator consists of two transistors, the longitudinal transistor 90 and the cross transistor 92, with a compensating resistance 93. This regulator, which is known per se, utilizes the base-emitter diode of the cross transistor 92 as a reference voltage figure at low operating voltages, because a Zener diode at these low voltages cannot be employed.

Consequently, a stabilization of this nature has a temperature gradient which matches that of the reference section, that is, the base-emitter section of the cross transistor 92. Without the cross transistor 92, the longitudinal transistor 90 would be open through the resistance 103. The part of the emitter voltage of the longitudinal transistor 90 taken from the voltage divider 104 and 105 makes the cross transistor 92 conductive when the emitter voltage of the longitudinal transistor exceeds the base-emitter voltage of the cross transistor. The current which then flows through the resistance 103 reduces the base current, and consequently the emitter current of the longitudinal transistor 90, until a balance is established between the partial voltage at the divider 104, 105 and the base-emitter voltage of the transistor 92. The output voltage of such a voltage regulator then falls with a drop in temperature, because the reference voltage of the base-emitter voltage likewise drops, about 0.003 per degree centigrade.

If a stabilizing arrangement of this nature is combined with a noncompensated trigger circuit, the temperature gradient of which therefore drops with increasing temperature, the operating voltage of the trigger connections will simultaneously be reduced by the voltage regulator as the temperature rises. As a consequence, the charging period of the capacitor 54 increases, and to such an extent that the temperature-dependence of the trigger arrangement is compensated by the temperature-dependence of the voltage regulator, that is to say, by the variation of the operating voltage. As a result of this, the electrical circuit taken as a whole has the desired indifference to temperature changes; that is, the shutter speed or time period which has been set, is not affected by temperature changes within the range above mentioned.

Figure 3:
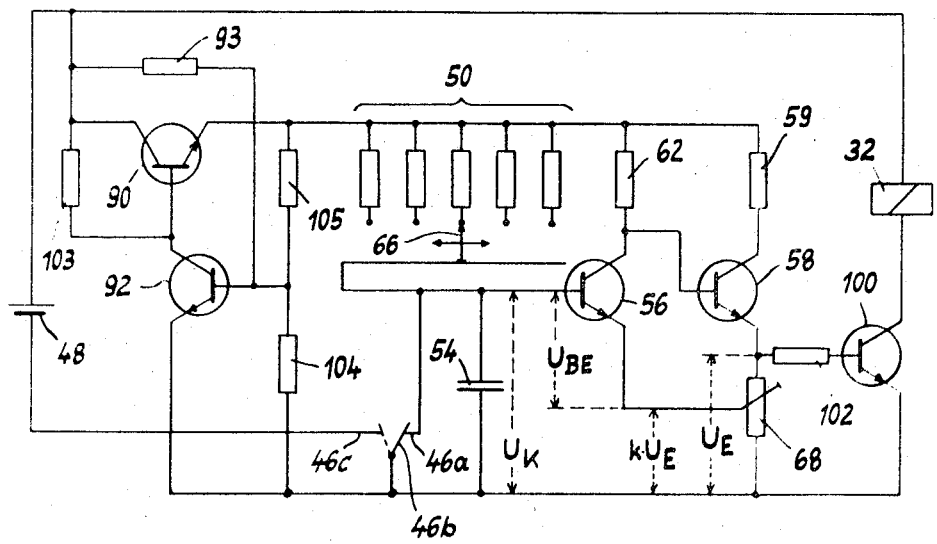
FIG. 3 is a wiring diagram illustrating the electronic circuitry according to another embodiment of the invention.

The electronic arrangement for controlling the shutter speed or exposure period, as illustrated in FIG. 3, has the property which has just been explained. In this case, the voltage regulator comprising the transistors 90 and 92 has no temperature compensation, so that it has a temperature gradient. In the trigger circuit, the output transistor 58, equipped with the collector resistance 59, is operated in the saturated or nearly-saturated range, and includes an emitter resistance 68 which is such that the proportion of the feedback voltage is small. This assumes a high amplification at the input transistor 56 and the feedback will then be only insignificantly affected by the temperature gradient of the output transistor. The temperature gradient of the base-emitter section of the input transistor 56 should be of the same order as that of the cross transistor 92 of the voltage regulator, and this can be insured by appropriate selection of the individual parts.

In accordance with another aspect of the present invention, still another transistor is connected wit in the voltage regulating and trigger connections as described above with relation to FIG. 3. This further transistor is indicated at 100, and is connected through a base resistance 102 with the emitter of the transistor 58, and is opened simultaneously with the opening of the transistor 58. Thus the transistor 100 switches in equiphase with the transistor 58, and connects the electromagnet winding 32 directly to the battery 48, so that the magnetizing current flowing through the winding 32, which is large in comparison with the current consumption of the trigger, is taken directly from the battery and thus has no effect on the regulating and temperature conditions of the voltage regulator.

The connections illustrated in FIG. 3 begin to exert their control effect explained above, as soon as the short circuiting of the capacitor 54 is removed or finished; that is, as soon as the switch member 46b is moved over from the short circuiting position in contact with member 46a, to the other position in contact with member 46c so that charging of the capacitor 46 is possible. When the sweep voltage is reached, the circuit switches over and the transistor 56, which previously had been dead or nonconductive, becomes conductive, while the transistor 58 exerts its blocking function. This variation of current supply of transistors 56 and 58 has the effect that the transistor 100 also blocks, and consequently the electromagnet winding 32 is effectively disconnected from the battery 48. In this way the temperature gradient of the voltage regulator, used for temperature compensation, is independent of the loading through the magnetic winding 32.

The parts of the circuitry illustrated in FIG. 3 which are essentially the same as corresponding parts of the circuitry illustrated in FIG. 2, have not been specifically described, but have been indicated by the same reference numerals used for the corresponding parts in FIG. 2. Also, certain connections or conductors have not been specifically mentioned with reference to either FIG. 2 or FIG. 3, but those skilled in the art of electronic circuits will readily understand both the arrangement of FIG. 2 and the arrangement of FIG. 3, from the diagrams themselves plus what has been said above.

Finally, it may be mentioned that the temperature compensating arrangement in accordance with the present invention is not necessarily confined to use in connection with the timing or speed of photographic shutters, but may be used also for temperature compensation of other electronic arrangements in photographic appliances, as for example in an electronic circuit for regulating or controlling diaphragm aperture rather than shutter speed.

It is to be understood that the disclosure is given by way of illustrative example only, rather than by way of limitation, and that without departing from the invention, the details may be varied within the scope of the appended claims.

We claim:

1. Photographic apparatus comprising electronic circuitry for controlling a variable factor, said circuitry comprising at least two transistors which have temperature gradients, and means interconnecting the transistors to each other so that the temperature gradient of one transistor is compensated by the temperature gradient of another transistor, said circuitry including an input transistor 56 and a transistorized voltage regulator having at least two transistors 90 and 92 and having a temperature gradient, said interconnecting means being so arranged that the temperature gradient of the base-emitter voltage of the input transistor 56 is compensated by the temperature gradient of the voltage regulator, whereby in the circuitry as a whole, said variable factor is controlled substantially independently of variations in temperature.

2. A construction as defined in claim 1, in which said circuitry includes a battery 48 and at least one magnetic winding 32, and an additional transistor 100 for connecting the battery directly to the magnetic winding, so that the temperature gradient of the voltage regulator, used for temperature compensation, is independent of any loading through said magnetic winding.

3. A construction as defined in claim 1, wherein said photographic apparatus is a photographic shutter and said variable factor is shutter speed.